Patented Oct. 29, 1940

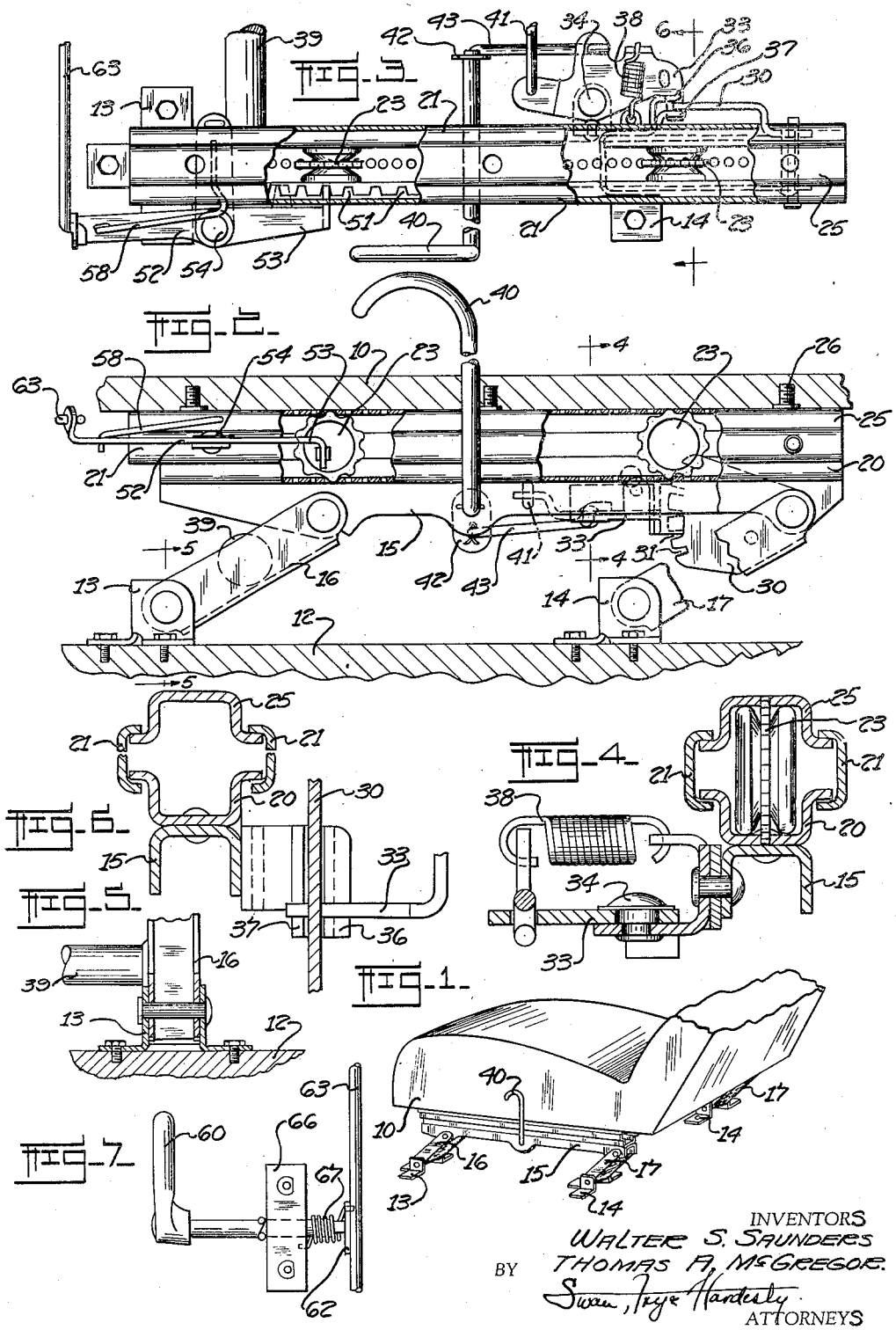

2,219,456

UNITED STATES PATENT OFFICE 2,219,456

ADJUSTABLE SEAT SUPPORT

Walter S. Saunders and Thomas A. McGregor, Pontiac, Mich., assignors to American Forging & Socket Company, Pontiac, Mich., a corporation of Michigan Application February 21, 1938, Serial No. 191,658

1 Claim. (Cl. 155—14)

This invention relates to improved and simplified structural means for adjustably supporting a desired object, such as the seat of an automobile or other vehicle.

An important object of the invention is to provide improved structural means whereby such a seat may be moved both forwardly and rearwardly and up or down, and which provides a desired degree of independent adjustment of such longitudinal and vertical positioning.

In the drawing:

Figure 1 is a perspective view, partly broken away, showing a seat of the character used in automobiles carried by adjustable supporting means constructed in accordance with the present invention.

Figure 2 is an enlarged side elevational view of the supporting apparatus, partly broken away, the adjacent seat and floor portions being shown in section.

Figure 3 is a plan view of one unit of the supporting mechanism, also partly broken away to show internal construction.

Figures 4 and 5 are detailed sections taken substantially on the lines 4—4 and 5—5 respectively of Figure 2 and looking in the direction of the arrows.

Figure 6 is a detailed section taken substantially on the lines 6—6 of Figure 3 and looking in the direction of the arrows, and Figure 7 is a fragmentary detailed plan view of the latch operating means for controlling longitudinal seat movement.

Referring now to the drawing, reference character 10 designates a seat, adjustably carried on a floor 12 by mechanism forming the subject matter of this invention. The supporting mechanism comprises two similar supporting assemblies, which may be symmetrically opposite in construction, one arranged beneath each end of the seat. Detailed description of one such assembly will accordingly suffice, although they might differ somewhat in details which will appear in the course of the description.

The seat is attached to the floor by means of front and rear floor brackets 13, 14 and front and rear parallel links 16, 17, articulated to such brackets and at their upper ends pivoted to a longitudinally extending seat supporting rail assembly 15. Rail assembly 15 carries a channel shaped track 20 upon which the seat is supported in a manner to allow longitudinal travel thereof by means of channel 25 similar to the track channel and inverted over the interposed rollers to substantially enclose the latter. Such enclosure is completed by additional channeled side plates 21 which overengage lateral flanges projecting outwardly from the track and carriage members. These may be secured to the carriage member and slide freely with respect to the track portion. Portions 21 serve to prevent separation of the carriage from the track, and also carry latching means for preventing longitudinal sliding movement of the seat except when manually released. A dog 53 is pivoted upon pin 54 carried by a bracket plate 52, which may extend through both of the channels 21 to tie them together, and outwardly from one thereof to support the dog. Such dog is provided with an inturned end extensible through a slot (undesignated) in the side plate 21 and swingable to engage the dog with or release it from any one of a series of notches 51 formed in the out-turned edge of track member 20. A spring 58 maintains the dog in yieldable engagement with one of such slots, holding the seat against longitudinal movement, while the dog is operable by a link as 63 connecting the same to a crank 62 swingable by means of an operating handle 60 mounted upon the under side of the seat near the center, as in bracket 66. A spring 67 urges the crank 62 and handle 60 toward the normal position in which the dog is engaged.

Each roller assembly may include a gear as 23 meshing with a series of perforations (undesignated) centrally punched along the top and bottom webs of the carriage and track portions respectively to guide their relative movement.

The carriage member is of course bolted or otherwise fixedly secured to the seat frame as at 26.

Independently operable locking means is provided for the vertical adjusting mechanism, adapted to hold the seat at any selected height by locking the supporting links in a desired angular position. A sector plate 30 is rigidly secured to the rear link 17 and provided with notches 31 disposed concentrically with the upper pivot of such link. A swingable latching dog 33 is pivoted on the seat rail assembly 15, as by means of the pin 34, projecting through an ear (undesignated) turned outwardly from the rail assembly.

If desired, the locking dog may be braced by projection aligned slots in ears 36, 37, also rigid with the rail assembly 15 and projecting upon either side of the slotted sector plate 30. The plate and ears thus provide cooperating abutments simultaneously engageable by the dog and greatly stiffening the latter. A spring 38 normally maintains the dog in engagement with the plate, thus holding the links 17 rigid and against angular movement with respect to the seat, which will be seen to prevent vertical movement of the latter.

A tubular torsion element 39 joins the front links 16 and is welded or otherwise secured to both, forcing the two links of such assemblies at opposite ends of the seat to move in unison. Dog 33 is also connected to the same dog (unshown), of the other seat supporting assembly at the opposite end of the seat, by means of a link 41, so that both may be operated simultaneously by the handle 40, which is pivoted in the webs of the channel-shaped rail assembly 15 and provided at its inner end with a crank 42, connected to the dog by means of a link 43.

What we claim is:

Adjustable supporting means for a seat or the like, comprising a plurality of links adapted to be pivotally attached at their lower ends to a suitable support, said links being swingable in substantially parallel relation, a frame pivoted to and supported by the upper ends of said links and adapted to support a seat, and means for holding at least one of said links in either of a plurality of angular positions with respect to said frame, comprising a locking portion rigidly carried by said link and having a plurality of abutment portions disposed substantially concentrically about the axis of pivotal connection of the upper end of said link and the frame, and dogging means carried by said frame including a member engageable with and disengageable from said abutment portions.

WALTER S. SAUNDERS.
THOMAS A. McGREGOR.